Nov. 2, 1965 W. R. JENKS ETAL 3,215,495
APPARATUS AND PROCESS FOR PREPARING HYDROGEN CYANIDE
Filed Jan. 23, 1962
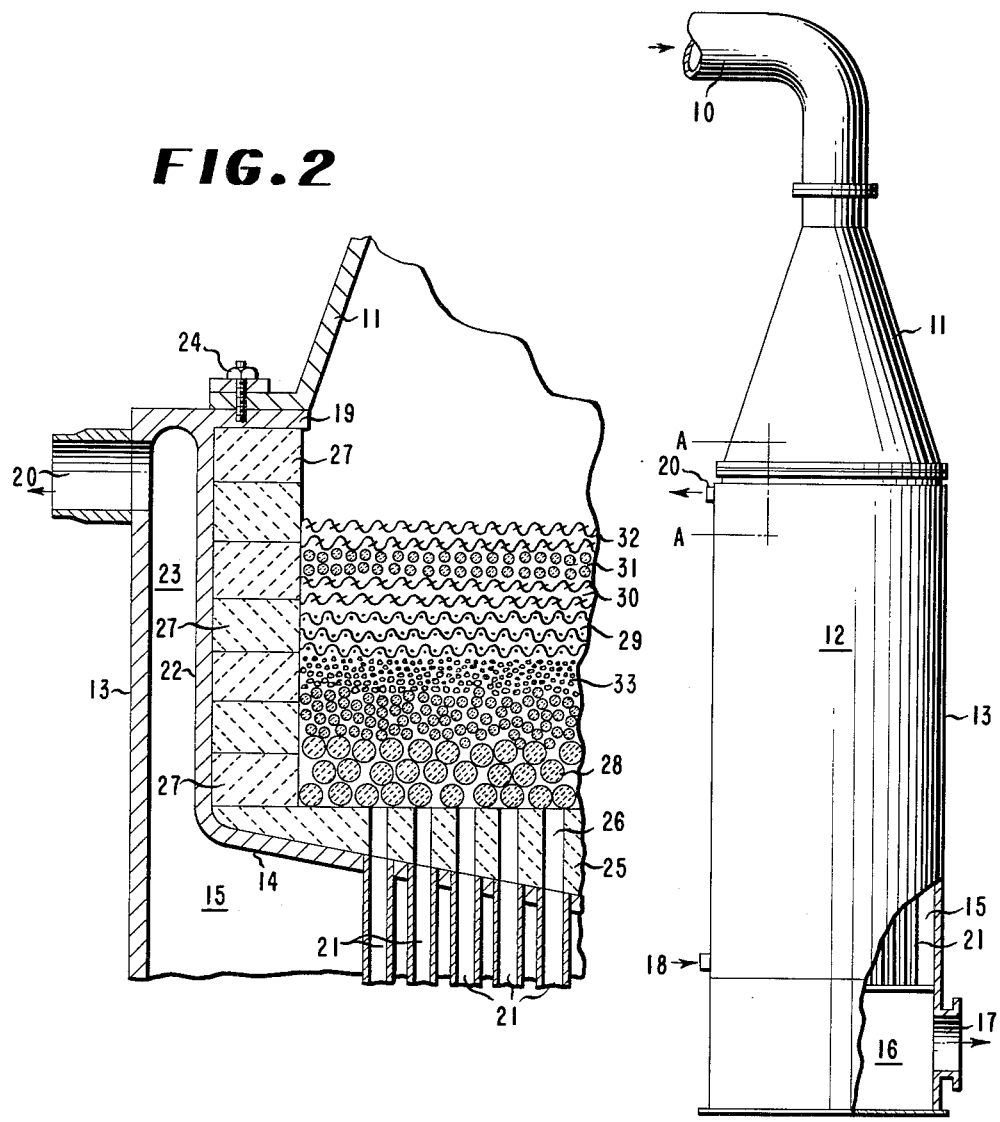
INVENTORS
ARTHUR W. ANDRESEN
WILLIAM R. JENKS
BY Joseph Frederic Walker
AGENT

3,215,495
APPARATUS AND PROCESS FOR PREPARING HYDROGEN CYANIDE
William R. Jenks, Memphis, Tenn., and Arthur W. Andresen, Newark, Del., assignors to E. I. du Pont de Nemours and Company, Wilmington, Del., a corporation of Delaware
Filed Jan. 23, 1962, Ser. No. 168,169
8 Claims. (Cl. 23—151)

This invention relates to an apparatus and process for making hydrogen cyanide by the reaction of ammonia, a hydrocarbon gas and oxygen in the presence of a platinum metal catalyst. It relates particularly to an improved reactor and process for the manufacture of hydrogen cyanide employing a platinum metal gauze, wire net or like structure as a catalyst.

The one-stage synthesis of hydrogen cyanide from ammonia and a hydrocarbon gas in which heat is supplied by simultaneous combustion reactions with oxygen or an oxygen-containing gas, such as air, in the presence of a platinum metal catalyst was disclosed by Andrussow in U.S. Patent 1,934,838 (November 14, 1933). Numerous modifications and improvements pertaining to this process have been described and patented. However, the platinum metal catalyst remains of outstanding value. This catalyst may be made of one of the platinum metals or alloys of two or more of these metals. Good results are obtained when this catalyst is maintained in the temperature range 1000° to 1200° C. and the off-gases are promptly cooled following the catalytic reaction. It is also essential that the reactor and process be controlled in such a manner that the catalyst never comes in contact with iron which is a catalyst for the decomposition of hydrogen cyanide and ammonia. Since the formation of hydrogen cyanide from ammonia and hydrocarbons is endothermic, oxygen sufficient to completely oxidize 40% or more of the total hydrocarbon and ammonia is normally added to supply the necessary heat. Modified processes in which a portion of this heat is supplied by preheating the reaction feed gases to about 525° C. have also been described. Oxygen addition to the feed gases should be minimal since the combustion reaction limits yields by destroying raw material which might otherwise become hydrogen cyanide. The combustion reaction also leads to formation of by-products such as carbon dioxide and water whose presence is highly undesirable and particularly so when the product is to be isolated as an alkali cyanide by direct absorption in aqueous alkali.

Practical methods for preventing heat loss from the catalyst bed are essential. This problem is particularly difficult due to the high temperatures developed when a platinum metal gauze catalyst surface faces the feed gases as they make contact with the catalyst. The intense radiation of heat from this surface constitutes an especially serious heat loss. In addition, radiation overheats the reactor walls contacting the feed gases. This results in undesirable reactions in the absence of the platinum metal catalyst including decomposition of ammonia. Feed gases may be overheated to such an extent as to lead to uncontrollable combustion reactions or explosions. If the reactor walls in contact with the feed gases are made of ordinary metal materials of construction, a relatively low melting metal, such as aluminum, may melt and a ferrous metal will corrode to form an oxide film which will catalyze decomposition of ammonia in the feed gas. Also corrosion may proceed to such an extent that flaking of metal oxide may lead to poisoning of the platinum metal catalyst. This problem may be combatted by applying cooling means to the reactor walls preceding the catalyst or by lining these walls with refractory materials. Such devices, unfortunately, increase processing and equipment costs without palliating the heat-loss from the catalyst surface itself. Covering the surface of the platinum metal catalyst facing the feed gas with particles of a solid refractory, such as porcelain, beryl, etc., prevents radiation but leads to carbonization and subsequent disintegration of the catalyst. Under these circumstances, a platinum metal gauze catalyst may disappear within a two to three week period of operation. Under proper operating conditions, the platinum metal catalyst should have a useful life of about one year or longer and radiation preventive means which result in a substantial decrease in catalyst life cannot be tolerated in view of the high cost of the catalyst.

The object of the present invention is to provide an improved process for the production of hydrogen cyanide by reaction of ammonia, hydrocarbon gas and oxygen in the presence of a platinum metal catalyst. A further object is to provide an improved catalytic reactor for making hydrogen cyanide from ammonia, hydrocarbon gas and air in the presence of a platinum metal catalyst. A still further object is to provide means for reducing heat loss from the surface of a hot platinum metal gauze catalyst facing the flow of feed gases in the manufacture of hydrogen cyanide without decreasing the normal working life of this catalyst. Other objects and advantages will become apparent during the following description and discussion of the invention.

The above-mentioned and further objects of this invention may be accomplished by employing a platinum metal catalyst reactor in which the surface of the catalyst facing the flow of feed gas is covered with a layer of inert refractory fiber which is preferably covered by a layer of refractory particles. Most preferably, the refractory particle layer is covered by an additional layer of refractory fiber. Although the advantages of this invention are particularly outstanding when the platinum catalyst is employed in the form of a metal gauze, wire net and the like, it is also of value when employed with a catalyst consisting of finely divided particles of platinum metal supported on a granular inert carrier such as silica or beryl. The radiation and catalyst disintegration problem are most acute with the gauze catalyst but they also constitute a problem with the granular catalyst.

The refractory fiber for use in the invention must be capable of withstanding at least about 1200° C. and must be completely free of iron and other known poisons for platinum metal catalysts. A preferred material is an alumina-silica refractory composition consisting of fine fluffy fibers in the form of a non-woven fabric or blanket known to the trade as "Fiberfrax" XLM as manufactured by the Carborundum Co. This material consists of approximately 50% $SiO_2$ and 50% $Al_2O_3$ and may contain a small amount of an inorganic binder or an organic resin binder which is oxidized on exposure to reactor temperatures. Modified silica and potassium titanate fibers may also be employed.

Although the most preferred reactor improvement employs two layers of refractory blanket with a refractory particle interlayer, the advantages of the invention may be obtained as previously stated by using the refractory fiber alone or preferably covered with refractory particles. However, refractory fiber alone is of limited utility since many of these fibers tend to become somewhat translucent at reaction temperatures. Also, a fiber cover when used alone may become displaced by the high velocity gas streams usually involved unless special means are developed to anchor them to the catalyst surface. Even when the fiber cover is employed with a single top layer of refractory particles, the refractory or ceramic particles tend to become displaced which leads to an irregular distribution of gas through the catalyst bed. The commercial silica-alumina refractory fiber, when provided with an organic resin binder, is not initially translucent to radiation but becomes so as soon as the binder is burned out at temperatures of 400° C. and above.

The advantages of this invention lie in the fact that by reducing heat losses from the catalyst bed without decreasing catalyst life, it makes it possible to (1) improve process control, (2) secure higher conversions of raw material to product, (3) reduce the cost of processing equipment, and (4) increase operating safety. The uniformly insulated bed can be operated at temperatures only 20° to 30° C. above the minimum since operation is less susceptible to adventitious variations in processing. This is due in part to the fact that the catalyst cover of this invention aids in improving the distribution of the feed gas flow through the catalyst bed and thus avoids hot spot occurrence. Also the refractory fiber acts as a filter to remove solid contaminants which may get into the feed gas stream and poison the catalyst. Excess hydrocarbon and air necessary to maintain the reaction temperature when heat is lost by radiation can be reduced. As a result, the ammonia concentration in the feed gas can be increased and the yield is improved since less raw material is oxidized or decomposed. Cooling of the reactor walls contacting the feed gas in the neighborhood of the catalyst or protection of these walls with a ceramic or fire brick lining is unnecessary. The danger of explosions and uncontrolled reaction of feed gases is substantially reduced since these gases are not overheated or exposed to high temperature surfaces.

An outsanding characteristic of this invention lies in the discovery that whereas refractory particles placed on the hot surface of a platinum metal gauze cataylst lead to carbonization and subsequent rapid disintegration of the gauze, a refractory fiber will not do so even when it supports a layer of refractory particles. Furthermore, the useful life of a platinum gauze is in no way decreased by the use of the invention.

The invention is particularly useful when employed in combination with the hydrogen cyanide reactor and process disclosed by Inman in U.S. Patent 2,782,107 (February 19, 1957). Inman employs an upright generally cylindrical reactor divided into three main sections. The upper section consists of a feed gas mixing chamber in the shape of a cone. The cone is positioned above the second section which consists of the platinum metal catalyst supported by a particulate refractory mass. The bottom layer of refractory particles insulates the catalyst bed from adjacent surfaces. The feed gas mixing chamber and the catalyst bed are supported by the lowest section of the reactor, a vertically disposed shell and tube heat exchanger which rapidly cools the hot product gases to 60° to 300° C. By superimposing the refractory fiber radiation screening device of this invention on the bare surface of a platinum metal catalyst facing the flow of feed gases, the cumulative effect of insulating the gauze catalyst on both sides results in outstanding heat savings and an unusually efficient process without any appreciable loss in catalyst working life.

In employing this invention, it is preferred to cover the catalyst surface with two approximately one-half inch layers of the alumina-silica "Fiberfrax" XLM fabric or blanket separated by an approximately three-eighths inch interlayer of porcelain pellets having a diameter of about one-eighth of an inch. When a hydrogen cyanide reactor operating with a platinum metal gauze catalyst at a temperature of over 1000° C. was provided with the refractory fiber catalyst cover described above, the conical walls of an aluminum metal feed gas mixing chamber directly above the catalyst bed did not exceed a temperature of 70° C. For best performance and stability in use, the upper and lower layers of the refractory blanket which are separated by the porcelain pellet layer should be sewed together with rope or cord made from the refractory fiber. The fabric may also be strengthened by use of fine nickel-chromium wires. Half-inch or other suitable lengths of staple refractory fiber may also be placed over the catalyst and held down by a layer of refractory fiber or porcelain pellets.

Additional details of the invention are clarified by the schematic drawings which are illustrative of the improved reactor and process.

FIGURE 1 is an elevation partly in section of a typical reactor in which the improvement of the invention may be utilized.

FIGURE 2 is an enlargement of that section of FIGURE 1 designated by the line A—A showing the catalyst bed.

The reactor illustrated in the two figures is similar to that of Inman, U.S. Patent 2,782,107. However, although the combination of the invention with the reactor and process disclosed by Inman is particularly useful, as previously noted, any hydrogen cyanide synthesis reactor using a platinum metal catalyst can be employed with advantage.

FIGURE 1 shows a hydrogen cyanide synthesis reactor in which a feed gas conduit 10 leads to a hollow cone 11, which serves as a feed gas mixing chamber, supported by a cylindrical heat exchanger 12. This cone may contain an internal baffle to facilitate gas mixing. Within the heat exchanger wall 13 is a steam chamber 15 and a collecting chamber 16 for effluent reaction product. This product gas may leave the system through outlet 17. The steam chamber possesses a lower inlet for water 18 and an upper outlet for steam 20. Steam chamber 15 and collecting chamber 16 together with tubes 21 comprise two fluid conductive systems with no internal communication between them.

FIGURE 2 shows the catalyst chamber contained by the re-entrant cylinder 22 with the conical bottom 14 pierced by tubes 21. Fluid passage is thus provided between the cone 11 and collecting chamber 16. Water or steam leg 23 connects with steam chamber 15 and outlet 20. The cone 11 is attached to the flanged top 19 of the heat exchanger 12 by bolt 24. Refractory plate 25 with cored holes 26 and cylindrical brickwork 27 makes up the refractory lining of the catalyst chamber.

Within the catalyst chamber, a layer of refractory insulating particles 28 supports a plurality of platinum metal gauzes 29. Preferred platinum metal gauze is formed from platinum-rhodium alloys containing between 50 and 90% platinum. The refractory fiber or fabric blanket layer 30 is placed in direct contact with the top platinum metal catalyst gauze and is in turn covered by refractory particles 31 and preferably a final layer of fiber or fabric 32.

Refractory particle layer 28 may consist of a top layer of one-eighth inch diameter porcelain pellets over larger pellets or irregular refractory masses. Alternatively, a bed of finely divided platinum metal catalyst supported on inert particles 33 such as silica or beryl, known as a granular catalyst, may separate the refractory insulating particles and the platinum metal gauze. In the absence of granular catalyst, the gauze layer may consist of 15 to 20 or more separate sheets of gauze whereas less than 10 gauzes may be employed over the granular supported catalyst. As previously noted, a platinum metal granular catalyst may be used and the gauze catalyst completely eliminated. This is not shown in the drawing.

When the reactor is in operation, a suitable reactant mixture of air, natural gas and ammonia is pumped into the cone, forced through the catalyst bed and ignited. Alternatively oxygen or oxygen enriched air may be employed in place of air and other gaseous hydrocarbons may be used instead of natural gas. A preheated reactant mixture may be employed if desired. The reaction is self-sustaining following ignition. Ignition may be brought about in various ways. A satisfactory procedure is to use an electric spark between two platinum wires that pierce the refractory fiber cover to contact the catalyst gauze pack. The feed gas or reactant mixture thus pases through the two layers of refractory fiber 32 and 30, the interlayer of refractory particles 31 and enters the gauze catalyst layer 29 where the synthesis reaction takes place at a temperature of 1000° to 1200° C., preferably in the range 1100°–1200° C. The effluent gases then pass down through the insulating refractory particles 28 and are conducted through the cored holes 26 and the tubes 21 where water in steam chamber 15 abstracts heat from the gases and is itself converted at least partially to steam. The cooled gases pass into collecting chamber 16 and out of the reactor to be separated. The cyanide product gases leave the reactor at reaction temperature and are rapidly cooled to a temperature in the range 60° to 300° C. on passage through tubes 21 of the heat exchanger 12. The layers of refractory particles, 28 and 31, must provide free passage for the gases. Many ceramic and refractory articles on the market are satisfactory for this purpose including broken bricks, pellets, irregular granules, cylinders, Raschig rings, Berl saddles, hollow tiles and the like. Layer 31 as previously noted is preferably made up of porcelain pellets having a diameter of about one-eighth of an inch.

Feed gas mixtures normally employed for hydrogen cyanide syntheses in platinum metal catalyst reactors not provided with the refractory fiber cover of this invention will give excessive temperatures due to the decrease in heat loss from the gauze catalyst of radiation. Accordingly, excess air of oxygen over that theoretically required for the conversion of ammonia and hydrocarbon to hydrogen cyanide can be reduced so that the reaction temperature will be maintained in the preferred range of 1100° to 1200° C. This may be readily done by anyone skilled in the art either by calculation or experimental reduction of oxygen or hydrocarbon feed. The exact amount of feed modification depends on the specific refractory fiber cover employed, reactor structure, gas flow rates, etc.

The following experiment is illustrative of the utility of this invention.

*Experiment*

Two ammonia-air-natural gas feed mixtures were converted to hydrogen cyanide using the apparatus shown in the figures except that in the first test, the platinum gauze layer was not covered by the ceramic blanket radiation shield of this invention. In the second test, the gauze layer was covered by two one-half inch layers of the alumina-silica "Fiberfrax" XLM fabric separated by a three-eighths inch interlayer of porcelain pellets having a diameter of about one-eighth of an inch. The proportion of air and natural gas to ammonia were reduced in the second test since it was possible to maintain the catalyst temperature with less hydrocarbon combustion. The results are shown in the following table. Since the natural gas consisted almost entirely of methane, it is indicated as methane in the raw material ratios.

|  | No Ceramic Blanket Test 1 | Ceramic Blanket Test 2 |
| --- | --- | --- |
| Reactant Gas Composition: |  |  |
| Volume Ratio—Air:Ammonia | 6.5:1 | 5.9:1 |
| Volume Ratio—Methane:Ammonia | 1.25:1 | 1.13:1 |
| Feed Gas Temperature, °C | 95 | 95 |
| Catalyst Bed Temperature, °C | 1,112 | 1,100 |
| Concentration of HCN in Product Gas, Vol., percent | 6.3 | 6.9 |
| Conversion of NH₃ to HCN, percent | 68.2 | 70.0 |
| Theoretical Yield on NH₃, percent | 84.5 | 86.4 |
| Conversion of Methane to HCN, percent | 55.5 | 61.5 |

As will be noted from the experimental data, use of the ceramic blanket made it possible to effect a 10% increase in productivity as witnessed by the increased hydrogen cyanide concentration of the product gas. Further, the conversion of methane to hydrogen cyanide increased from 55.5% to 61.5%. The blanket also allowed operation of the process at a somewhat lower catalyst bed temperature.

The invention is subject to various modifications which will be readily apparent to one skilled in the art. The converter need not be always maintained in an upright position. If it is turned on its side, however, arrangements must be made to secure the gauze layers and the refractory fiber covers to facilitate retention in position. However, the benefits from the pull of gravity are optimal when the reactor is upright so that the latter position with downward flow of gases is preferred. It is not essential that the reactor be cylindrical and a reactor with a square cross-section may be employed if desired.

We claim:

1. In the process for producing hydrogen cyanide wherein a reactant mixture comprising ammonia, oxygen and a hydrocarbon gas is reacted in a bed containing a platinum metal gauze catalyst, the improvement for controlling reaction and preventing heat loss by radiation from the surface of said guaze catalyst adapted to face the flow of the said reactant mixture by the steps comprising:

(a) adjusting the components of said reactant mixture so that the proportion of excess oxygen and hydrocarbon over that theoretically required for the conversion of ammonia to hydrogen cyanide in the synthesis reaction is such that the reaction temperature will fall in the range 1000° to 1200° C. under process conditions, (b) conducting the said reactant mixture into a reaction chamber and immediately thereafter passing said mixture through a radiation screen comprising a layer of refractory particles supported by a layer of refractory fiber in direct contact with the said gauze catalyst, (c) reacting the said reactant mixture in contact with the said gauze catalyst, (d) conducting the product gases from the said gauze catalyst through an insulating layer of refractory particles and thence (e) leading the said product gases through heat transfer tubes cooled by water and steam to reduce gas temperatures to 60° to 300° C.

2. In the process for producing hydrogen cyanide wherein a reactant mixture comprising ammonia, oxygen and a hydrocarbon gas is reacted in a bed containing a platinum metal catalyst, the improvement for controlling reaction and preventing heat loss by radiation from the surface of said catalyst adapted to face the flow of the said reactant mixture by the steps comprising:

(a) adjusting the components of the said reactant mixture so that the proportion of excess oxygen and hydrocarbon over that theoretically required for the conversion of ammonia to hydrogen cyanide in the synthesis reaction is such that the reaction temperature will fall in the range 1000° to 1200° C. under process conditions, (b) conducting the said reactant mixture into a reaction chamber and immediately thereafter passing said mixture through a radiation screen comprising a layer of refractory fiber in direct contact with the said catalyst, (c) reacting the said reactant mixture in contact with the said catalyst, (d) conducting the product gases from the said catalyst through an insulating layer of refractory particles and thence (e) leading the said product gases through heat transfer tubes cooled by water and steam to reduce gas temperatures to 60° to 300° C.

3. In the process for producing hydrogen cyanide wherein a reactant mixture consisting of ammonia, air and natural gas is reacted in a bed containing a platinum metal gauze catalyst, the improvement for controlling reaction and preventing heat loss by radiation from the surface of said gauze catalyst adapted to face the flow of the said reactant mixture by the steps comprising:

(a) adjusting the components of the said reactants mixture so that the proportion of excess air and natural gas over that theoretically required for the conversion of ammonia to hydrogen cyanide in the synthesis reaction is such that the reaction temperature will fall in the range 1100° to 1200° C. under process conditions, (b) conducting the reactant mixture into a reaction chamber and immediately thereafter passing said mixture through a radiation screen consisting of two approximately one-half inch layers of a silica-alumina refractory fiber blanket separated by an interlayer of approximately three-eighths of an inch of porcelain pellets having a diameter of approximately one-eighth of an inch, said blanket being in direct contact with the said gauze catalyst, (c) reacting the said reactant mixture in contact with the said gauze catalyst, (d) conducting the product gases from the said gauze catalyst through an insulating layer of refractory particles and thence (e) leading the said product gases through heat transfer tubes cooled by water and steam to reduce gas temperatures to a temperature in the range 60° to 300° C.

4. An upright cylindrical reactor for making hydrogen cyanide from ammonia, hydrocarbon gas and oxygen by catalytic combustion at temperatures in the range from about 1000° C. to 1200° C. comprising (a) a feed gas mixing chamber for receiving inflowing gases, (b) a refractory lined catalyst chamber in communication with said mixing chamber having a porous platinum catalyst bed supported therein by a gas pervious refractory mass, said refractory mass being supported by a perforated refractory plate, (c) a blanket of inert refractory fibers in direct contact with and covering said catalyst thereby screening said inflowing gases from radiation from said catalyst, and (d) means for withdrawing effluent gases from said reactor.

5. The reactor of claim 4 wherein a layer of refractory particles is positioned on top of said blanket of fibers.

6. The reactor of claim 5 wherein a second blanket of inert refractory fibers is positioned in overlaying contact with said layer of refractory particles.

7. The reactor of claim 6 wherein said fibers are silica-alumina fibers and said refractory particles are porcelain pellets.

8. The reactor of claim 6 wherein said catalyst is in the form of platinum metal gauze, said fiber blankets each have a thickness of about one-half inch, and said refractory particles are distributed in a layer having a thickness of about three-eighths inch and are in the form of porcelain pellets having an average diameter of about one-eighth inch.

References Cited by the Examiner

UNITED STATES PATENTS

| | | | |
|---|---|---|---|
| 1,773,322 | 8/30 | Sirdevan | 23—288 |
| 2,782,107 | 2/57 | Inman | 23—151 X |

FOREIGN PATENTS

| | | |
|---|---|---|
| 755,329 | 8/56 | Great Britain. |

MAURICE A. BRINDISI, *Primary Examiner.*